(12) United States Patent
Büttner et al.

(10) Patent No.: US 11,183,909 B2
(45) Date of Patent: Nov. 23, 2021

(54) SQUIRREL-CAGE ROTOR, IN PARTICULAR FOR HIGH ROTATIONAL SPEEDS

(71) Applicant: SIEMENS AKTIENGESELLSCHAFT, Munich (DE)

(72) Inventors: Klaus Büttner, Hollstadt (DE); Klaus Kirchner, Ostheim (DE); Matthias Warmuth, Windshausen (DE)

(73) Assignee: Siemens Aktiengesellschaft, Munich (DE)

( * ) Notice: Subject to any disclaimer, the term of this patent is extended or adjusted under 35 U.S.C. 154(b) by 332 days.

(21) Appl. No.: 16/327,748

(22) PCT Filed: Aug. 4, 2017

(86) PCT No.: PCT/EP2017/069775
§ 371 (c)(1),
(2) Date: Feb. 22, 2019

(87) PCT Pub. No.: WO2018/036787
PCT Pub. Date: Mar. 1, 2018

(65) Prior Publication Data
US 2019/0229597 A1    Jul. 25, 2019

(30) Foreign Application Priority Data
Aug. 24, 2016    (EP) .................................... 16185511

(51) Int. Cl.
*H02K 17/16*    (2006.01)
*H02K 15/00*    (2006.01)
*H02K 17/20*    (2006.01)

(52) U.S. Cl.
CPC ....... *H02K 17/165* (2013.01); *H02K 15/0012* (2013.01); *H02K 17/20* (2013.01)

(58) Field of Classification Search
CPC .. H02K 17/165; H02K 15/0012; H02K 17/20; H02K 17/16
(Continued)

(56) References Cited

U.S. PATENT DOCUMENTS

| 4,686,398 A | * | 8/1987 | Lechner | ............... H02K 21/145 310/163 |
| 2007/0075603 A1 | * | 4/2007 | Whiddon | ............. H02K 17/165 310/211 |

(Continued)

FOREIGN PATENT DOCUMENTS

| CA | 2980194 A1 | 9/2015 |
| CN | 101765961 A | 6/2010 |

(Continued)

OTHER PUBLICATIONS

Voggeser, Volker et al "Investigation on the mechanical and elctromagnetical performance of a squirrel cage induction machine with radially laser welded and ring connections" "2015 5th International Electric Drives Production Conference (EDPC)".

(Continued)

*Primary Examiner* — Ahmed Elnakib
(74) *Attorney, Agent, or Firm* — Henry M. Feiereisen LLC (57) ABSTRACT

The invention relates to a squirrel-cage rotor (3) of an asynchronous machine (1) having electrical conductors, which are provided in substantially axially extending grooves of a laminated core (5). On each end face of the laminated core (5), at least one short-circuit ring is provided, which electrically connects at least a predetermined number of the electrical conductors, wherein the short-circuit ring has a reinforcement (24) made of comparatively high-strength material.

15 Claims, 8 Drawing Sheets

(58) Field of Classification Search
USPC .................................. 310/211, 221, 219, 194
See application file for complete search history.

(56) References Cited

U.S. PATENT DOCUMENTS

| | | | |
|---|---|---|---|
| 2009/0033170 | A1 | 2/2009 | Jakobi et al. |
| 2010/0247347 | A1 | 9/2010 | Yoshino et al. |
| 2012/0126657 | A1* | 5/2012 | Gerard ............... H02K 15/0012 |
| | | | 310/211 |
| 2012/0210563 | A1 | 8/2012 | Wang et al. |
| 2012/0248901 | A1 | 10/2012 | Maeda et al. |
| 2013/0181570 | A1 | 7/2013 | Iizuka et al. |
| 2013/0187511 | A1 | 7/2013 | Lipot |
| 2014/0035423 | A1* | 2/2014 | Veronesi ............ H02K 15/0012 |
| | | | 310/194 |
| 2014/0167554 | A1 | 6/2014 | Oshida et al. |
| 2015/0349616 | A1 | 12/2015 | Buttner et al. |
| 2017/0085162 | A1 | 3/2017 | Arndt et al. |
| 2019/0229597 | A1 | 7/2019 | Buttner et al. |

FOREIGN PATENT DOCUMENTS

| | | |
|---|---|---|
| CN | 102651590 A | 8/2012 |
| CN | 102738988 A | 10/2012 |
| CN | 102918754 A | 2/2013 |
| CN | 103748771 A | 4/2014 |
| CN | 204931903 U | 1/2016 |
| CN | 105305752 | 2/2016 |
| CN | 106464106 A | 2/2017 |
| CN | 109478831 A | 3/2019 |
| DE | 19919899 * | 9/2000 |
| DE | 102005030798 A1 | 1/2007 |
| DE | 102015202004 A1 | 8/2018 |
| EP | 2214289 A2 | 8/2010 |
| EP | 2549630 A1 | 1/2013 |
| EP | 2953245 A1 | 12/2015 |

OTHER PUBLICATIONS

Yong, Su et al "High-period fatigue performance test of a series squirrel cage elastic support" vol. 2, No. 2 2014.
PCT International Search Report and Written Opinion of International Searching Authority dated Sep. 27, 2017 corresponding to PCT International Application No. PCT/EP2017/069775 filed Aug. 4, 2017.

* cited by examiner

SQUIRREL-CAGE ROTOR, IN PARTICULAR FOR HIGH ROTATIONAL SPEEDS

CROSS-REFERENCES TO RELATED APPLICATIONS

This application is the U.S. National Stage of International Application No. PCT/EP2017/069775, filed Aug. 4, 2017, which designated the United States and has been published as International Publication No. WO 2018/036787 and which claims the priority of European Patent Application, Serial No. 16185511.9, flied Aug. 24, 2016, pursuant to 35 U.S.C. 119(a)-(d).

BACKGROUND OF THE INVENTION

The invention relates to a squirrel-cage rotor of an asynchronous machine having electrical conductors, which are provided in substantially axially extending grooves of a laminated core, wherein on each end face of the squirrel-cage rotor at least one short-circuit ring is provided, which electrically connects at least a predetermined number of the electrical conductors. Furthermore, the invention relates to a dynamoelectric machine with such a squirrel-cage rotor and the use of such a dynamoelectric machine. In addition, the invention relates to a method for manufacturing such a squirrel-cage rotor, in which a squirrel-cage rotor is created by means of punching and packaging a laminated core.

Squirrel-cage rotor in dynamoelectric rotary asynchronous machines can usually be used up to a circumferential speed of approx. 90 m/s on the rotor. A suitability for higher speeds is only possible by means of special measures.

Due to demands for ever more compact design or applications of direct drives for transmission savings, rotational speed requirements now reach up to circumferential speeds of 200 m/s on the rotor which at an axle height 160, for example, corresponds to a rotational speed of approx. 25,000 rpm.

The centrifugal force is square to the rotational speed, so that the material stress, in particular in the short-circuit ring of a squirrel-cage rotor increases significantly with an increase in rotational speed. Maximum permissible mechanical stresses in the short-circuit ring of up to approx. 80 N/mm$^2$ are possible using common aluminum materials with a density of 2.7 kg/dm$^3$.

However, at conventional short-circuit ring temperatures in the region of 150 to 200° C., pure aluminum only has a tensile strength of 20 N/mm$^2$ maximum and is thus excluded as a casting compound for the desired high rotational speed ranges.

Due to its density of 8.9 kg/dm$^3$, copper is likewise unsuitable for very high rotational speeds because at the desired rotational speeds and the associated centrifugal force stresses, the yield strength of copper is exceeded.

However, materials such as pure aluminum (electrical conductivity 36 m/Ω mm$^2$) or copper (electrical conductivity 56 m/Ω-mm$^2$) are especially suitable for also making the dynamoelectric machine highly efficient. With the known alloys of aluminum and copper, conductivity values of the pure casting compounds of aluminum and copper cannot be achieved.

In order to now obtain such rotational speed ranges with simultaneous efficiency of a dynamoelectric machine, supporting rings made of a wide variety of materials are known at the outer diameter of a short-circuit ring. The disadvantage here is that the ring is supported only outwards, the material in the inner region of the short-circuit ring can, however, flow due to the high centrifugal forces and mechanical stresses. In this way, inter alia, the balancing values change on the squirrel cage rotor, in particular in the short-circuit ring.

Efforts are also made to achieve these high rotational speeds through the use of high-strength alloys with increased tensile strength to approx. 80 N/mm$^2$. The disadvantage here is that the electrical conductivity is at values of 20 to 29 m/Ω-mm$^2$ and is thus significantly lower than in the case of pure aluminum. Due to the higher brittleness of these alloys, the extensibility is also lower, as a result of which the susceptibility to mechanical stress cracks on the short-circuit ring increases.

The alloys in the crucible also cause precipitates of alloying constituents, which can be strontium, silicon, manganese, etc.

This in turn reduces the quality of the melt in the reference to the electrical conductivity and the mechanical strength values. The process reliability and process quality of the pressure casting is thus extremely difficult to maintain. This is done, for example, by constant analysis of samples from the melt, and by a subsequent alloying required as a result, in that the alloy constituents are added and distributed as uniformly as possible by stirring mechanisms.

In addition, casting under protective gas means considerable additional outlay. Particularly in the case of drives in the motor vehicle industry, this method is associated with very high outlay and costs on account of the required process reliability and therefore achieves comparatively little acceptance in asynchronous and rotor technology.

Based on this, the object of the invention is to provide a dynamoelectric machine, in particular an asynchronous machine, with a squirrel-cage rotor, which is suitable for high circumferential speeds on the rotor, in particular up to 200 m/s, and offers a suitable drive for drive technology, inter alia, in vehicles as well as in machine tools with comparatively high efficiency.

SUMMARY OF THE INVENTION

The solution of the stated object is achieved by a squirrel-cage rotor of an asynchronous machine having electrical conductors, which are provided in substantially axially extending grooves of a laminated core, wherein on each end face of the laminated core at least one short-circuit ring is provided, which electrically connects at least a predetermined number of the electrical conductors, wherein the short-circuit ring has a reinforcement made of comparatively high-strength material.

The solution of the stated object is also achieved by a dynamoelectric machine, in particular an asynchronous machine with a squirrel-cage rotor according to the invention.

The solution of the stated object is also achieved by a machine tool, an e-car, a compressor drive or a pump drive with at least one dynamoelectric machine with a squirrel-cage rotor according to the invention.

The solution of the stated object is likewise achieved by a method for producing a squirrel-cage rotor by means of the following steps:
  Punching and packaging of a laminated core of the squirrel-cage rotor,
  Fastening of a suitable reinforcement on the end faces of the laminated core,
  Injection of a conductive casting compound into the reinforcement and the groove spaces of the laminated core by way of at least one injection channel.

The aforementioned disadvantages are avoided according to the invention by a reinforcement in the areas of the short-circuit ring. Due to its structure, this reinforcement is preferably produced in an additive manufacturing method (3-D printing method) or by means of combined stamped and deep-drawn parts and inserted into the die casting tool before the short-circuit cage is poured into the laminated core.

Thus, metals with very high tensile strength, such as titanium, steel, can now be used for the reinforcement. The reinforcement is as closed as possible on the outer and on the inner diameter, as well as on the end faces of the short-circuit ring. In between, a fine mesh, a framework structure or lattice structure or a micro-scale structure is provided, which gives the short-circuit ring in operation the necessary support, but ensures sufficient efficiency of the asynchronous machine due to its comparatively small volume fraction of about 5 to 10%. The current flow is only insignificantly impeded.

While the outer and inner diameter of the reinforcement are designed to be closed, small openings for degassing during the diecasting process are advantageously provided on the lateral surfaces, that is to say, the surfaces facing away from the laminated core, thus avoiding damaging void formation during the casting process. In addition, the recesses provided for the electrical conductors are provided on the lateral surfaces in the direction of the laminated core.

The invention is also suitable for a cage structure in which prefabricated copper rods are inserted into grooves of the laminated core which advantageously protrude axially on the end faces of the laminated core and protrude into the reinforcement so that by means of a subsequent casting process, for example, these copper rods are now embedded in aluminum by means of aluminum, whereas the short-circuit ring is almost penetrated by aluminum and is held at high rotational speeds by the reinforcement.

In this case, the reinforcement can additionally assume the function of fastening the conductor bars, in particular radially and uniformly, to the inside and outside during die-casting.

By means of this method according to the invention for producing and constructing the squirrel-cage rotor, it is now possible to work with a casting compound made of pure aluminum 99.7%. The aforementioned disadvantages using an alloy can thus be avoided. The electrical conductivity is now substantially higher than in the listed alloys. In addition, a uniformly distributed homogenous reinforcement is present in the short-circuit ring which stabilizes this in all areas.

A change or flow by high centrifugal forces on the outer or inner area of the short-circuit ring is thereby reliably avoided. Due to the closed inner ring area of the reinforcement, an additional hold is achieved which counteracts an expansion of the short-circuit ring.

By means of a closed outer ring and a closed surface on at least one end face of the reinforcement, the outer area of the short-circuit ring is also protected from an impermissible change and expansion, above all in the high rotational speed range.

At medium-high rotational speeds, it may be useful to provide such a reinforcement or lattice structure only at the radial edge of the outer region of the short-circuit ring.

As a result of the design of the squirrel cage rotor according to the invention, in particular of the short-circuit rings, a comparatively high efficiency is achieved, which cannot be achieved in the case of pure aluminum as a casting compound and the required rotational speeds.

Imbalances of the squirrel-cage rotor during the production process and during operation of the dynamoelectric machine are avoided as this homogeneous stabilization of the short-circuit ring ensures a permanent stabilization.

The concept according to the invention is suitable for all cages of squirrel-cage rotors, whether classical aluminum cages, hybrid cages, i.e. Cu-conductor rods embedded in aluminum, wherein the short-circuit ring is essentially composed of aluminum or copper cages. The concept according to the invention is also suitable for special squirrel-cage rotors (for example, double or multiple cage rotors with cages isolated from one another).

BRIEF DESCRIPTION OF THE DRAWING

The invention and advantageous embodiments of the invention are explained in more detail with reference to exemplary embodiments shown in principle. The diagrams show in.

DETAILED DESCRIPTION OF PREFERRED EMBODIMENTS

Figure 1:
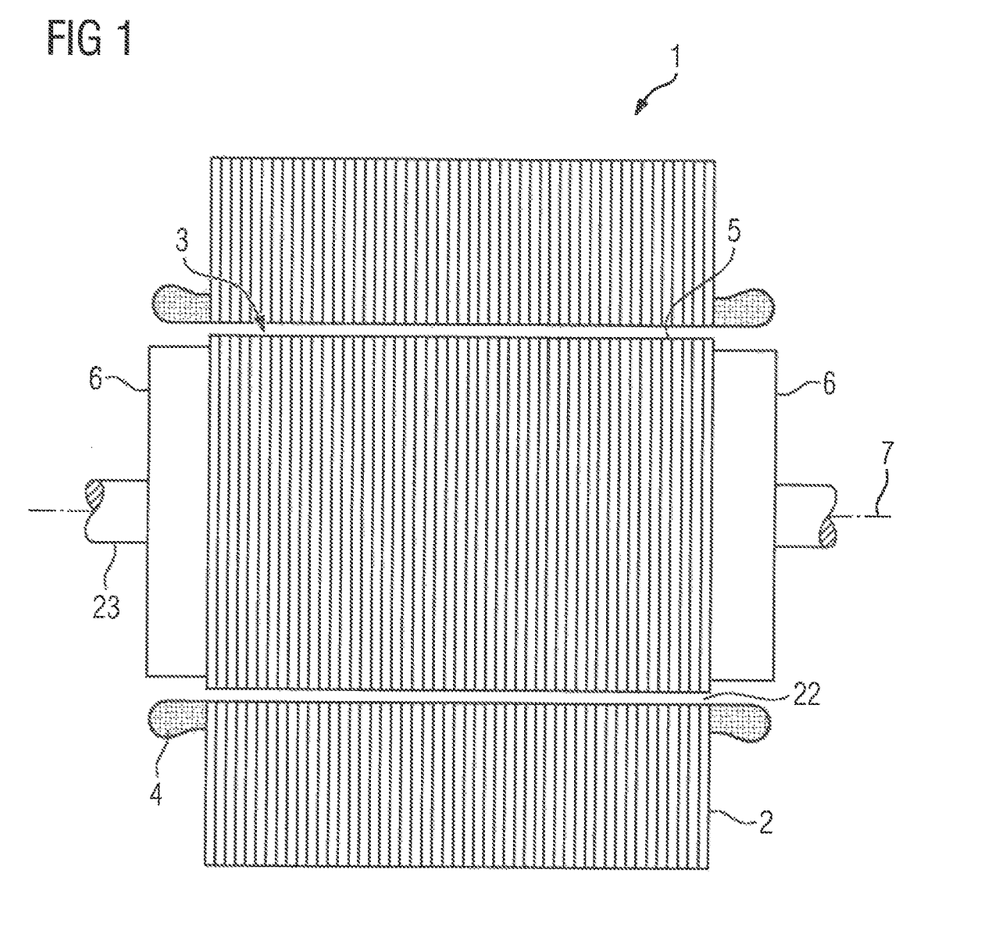
FIG. 1 a longitudinal section of an asynchronous machine.

FIG. 1 shows a schematic representation of a longitudinal section of a dynamoelectric machine 1, in particular of an asynchronous machine with a squirrel-cage rotor 3. The stator 2 has a winding system 4 which forms 2 winding heads on the end faces of the stator 2.

During operation of the asynchronous machine, an electromagnetic interaction between the stator 2 and the squirrel cage rotor 3 occurs via an air gap 22, which brings about a rotation of the squirrel-cage rotor 3 about an axis 7. A laminated core 5 of the squirrel-cage rotor 3 is connected in a rotationally fixed manner to a shaft 23.

The squirrel-cage rotor 3 has grooves which are designed to be almost axis-parallel or slightly inclined—up to approximately two groove intervals—In their axial extension. Electrical conductors, which are not illustrated in greater detail in this illustration, are located in the grooves, which are electrically conductively connected to the short-circuit rings 6 of the squirrel-cage rotor 3.

Figure 2:
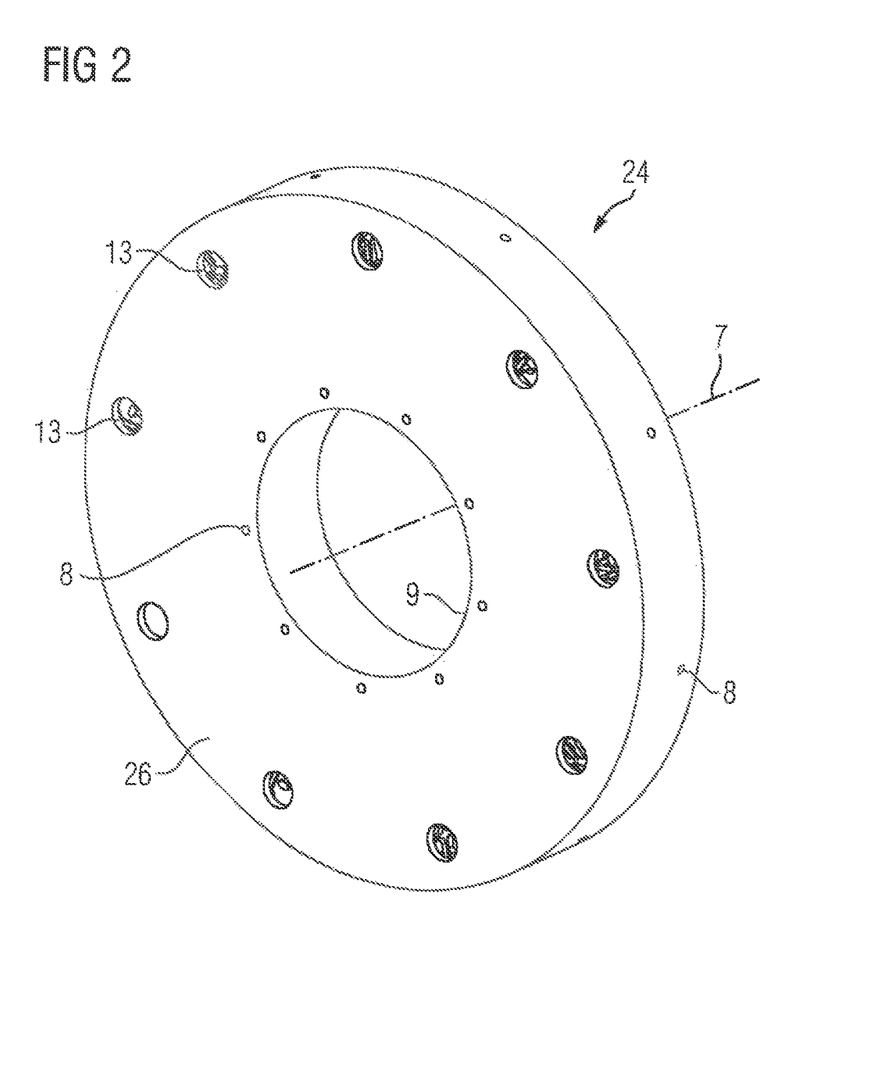
FIG. 2 a perspective view of a reinforcement.

In order to be able to use the squirrel-cage rotor 3 even at high rotational speeds of up 200 m/s of circumferential speed, the short-circuit ring 6 has a reinforcement 24 according to FIG. 2, which consists of an outer contour 10, an inner contour 9 and the lateral surfaces 25 required for this purpose for the outer and lateral surfaces 26 for the inside, that is to say, facing the laminated core. In addition, recesses 8 for venting are distributed on the outer contour 10 and/or on the lateral surface 25, 26 which qualitatively improve the casting process during the pressure casting process.

In addition, injection channels 13 are provided on the lateral surface 25 in order to feed the electrical fluid material into the reinforcement as well as the groove spaces of the laminated core 5.

FIG. 2 also shows the reinforcement 24 of the short-circuit ring 6, which is positioned on the end faces of the laminated core 5 of the squirrel-cage rotor 3 before production, in particular the casting process. The injection channels 13 in this view are round but, depending on the requirement for the groove shape of the squirrel cage rotor 3, can also be drop-shaped, etc., in order to provide the largest possible flow channel during production. Depending on the requirements (current displacement effects), the groove shape can be designed to be rounded, drop-shaped, trapezoidal, etc., on the squirrel-cage rotor 3.

The reinforcement 24 does not necessarily have to rest directly on the end face of the laminated core 5. In order to obtain a short-circuit ring 6 which is spaced apart from the end face, intermediate elements can be used which, if appropriate, can be removed after the casting process.

The entire casting process takes place via one of the reinforcements 24, so that at least on an end face 26 of a reinforcement 24, a material access opening is provided.

Figure 3:
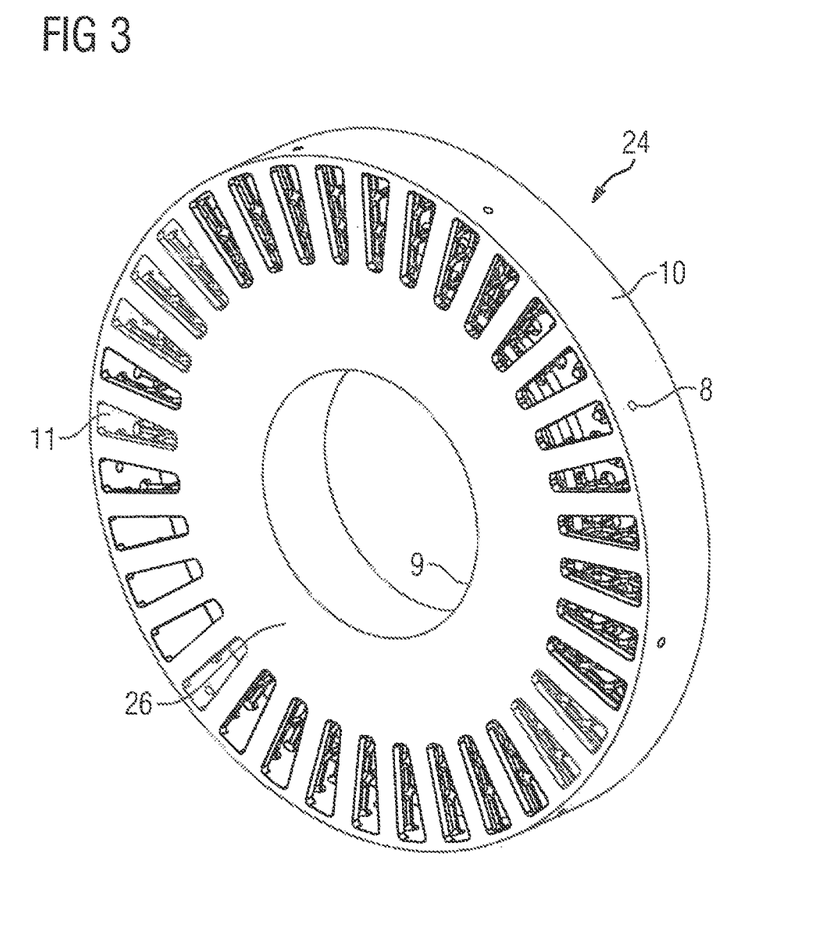
FIG. 3 a further perspective view of the reinforcement.

FIG. 3 shows a reinforcement 24 of the short-circuit ring 6 from the perspective of the laminated core 5. The lateral surface 26 facing the laminated core 5 has openings 11 which are provided for accommodating the electrical conductors, whether for the casting process and/or inserted as shaped rods. There are no recesses for venting on this lateral surface 26.

Figure 4:
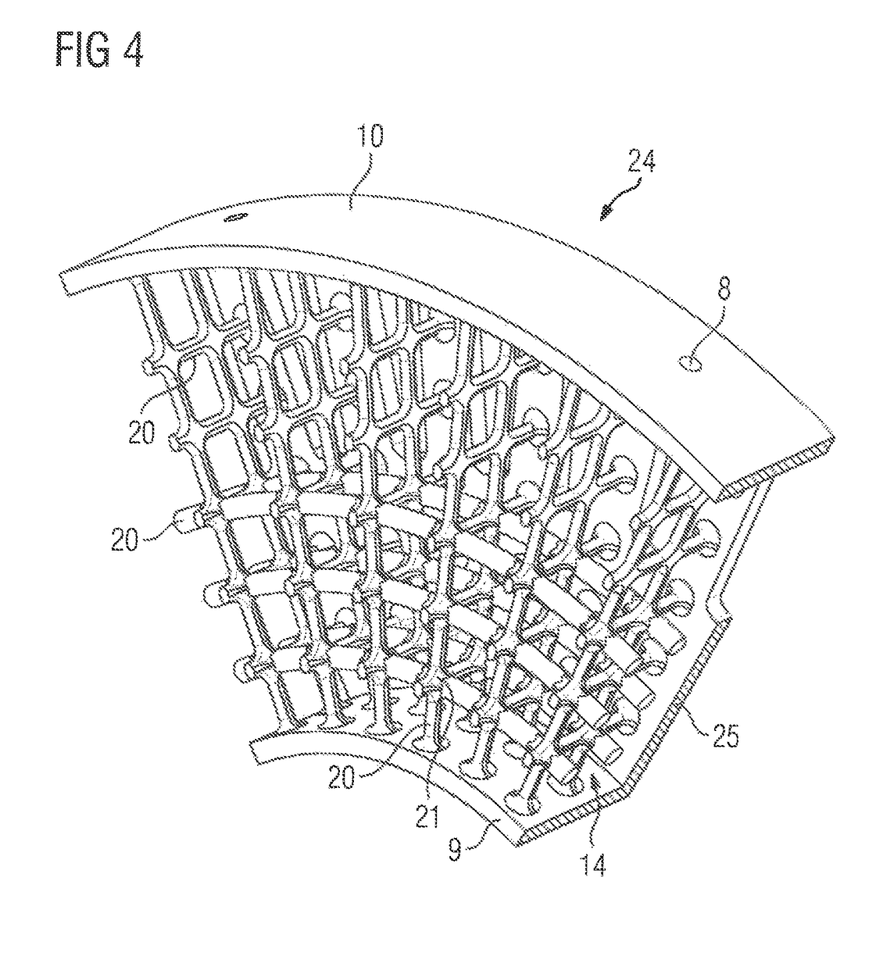
FIG. 4 a detailed view of the lattice structure inside the reinforcement.

In a partial section of the reinforcement 24, FIG. 4 shows the outer contour 10 as well as the inner contour 9 and the lattice structure 14 present within these contours and the lateral surfaces 25, 26. This lattice structure 14 supports the conductor material within the short-circuit ring 6, in particular at high rotational speeds. The lattice structure 14 shown there has webs 20 which are joined together at nodes 21.

The basic structure is arranged as follows: starting from the inside of the inner contour 9, radial webs 20 extend to the inside of the outer contour 10, wherein further webs 20 are provided both in the circumferential direction and in the radial and axial direction. Nodes 21 are arranged at the intersection points of the webs 20, which serve to stabilize the entire lattice structure 14 within the reinforcement 24.

The reinforcement 24 is produced with additive production methods on account of the complex, in particular microscale lattice structure 14. The production methods, which are also referred to as 3-D printing methods, can therefore be used to produce complicated one-piece reinforcements from one or more tensile materials such as steel and/or titanium.

Figure 5:
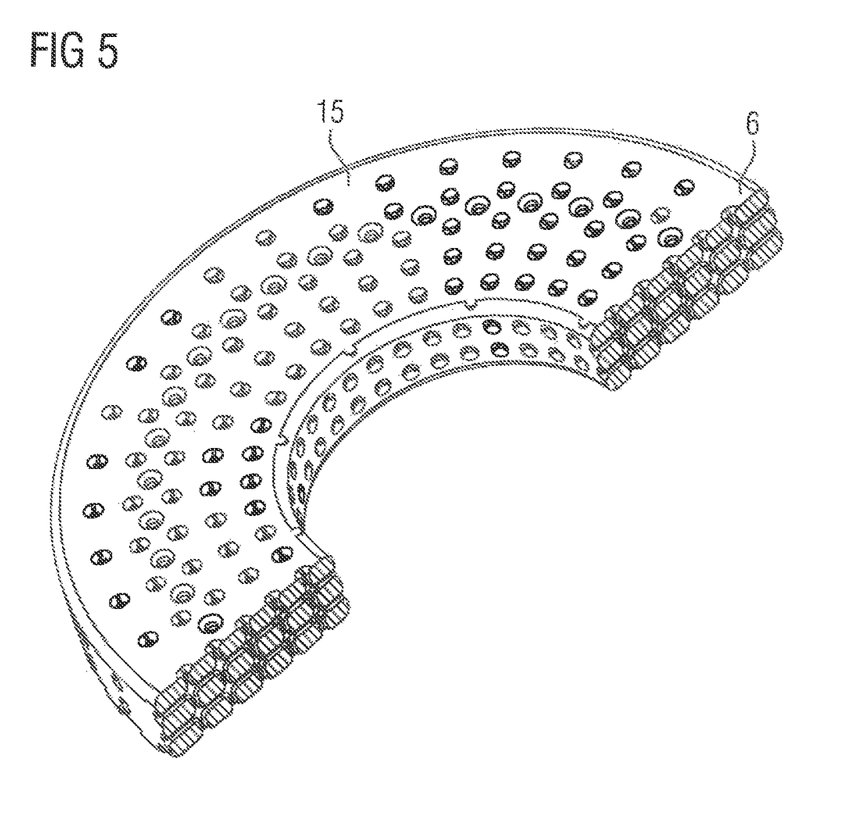
FIG. 5 a partial perspective view of a section through the conductive material after a pressure casting process, FIG. 6 a partial perspective view of individual disks, FIG. 7 an exploded view of individual disks, FIG. 8 an overall view of a reinforcement, produced by means of individual disks, and FIG. 9 a reinforcement composed of deep-drawn sheets.

The electrically conductive material, for example, liquid aluminum, is now fed into the reinforcement 24 by means of a die casting method and then occupies the volume not occupied by the lattice structure 14. This results in a structure of the conductor material according to FIG. 5 which shows a "half" short-circuit ring 6, without the supporting lattice structure 14.

Figure 6:
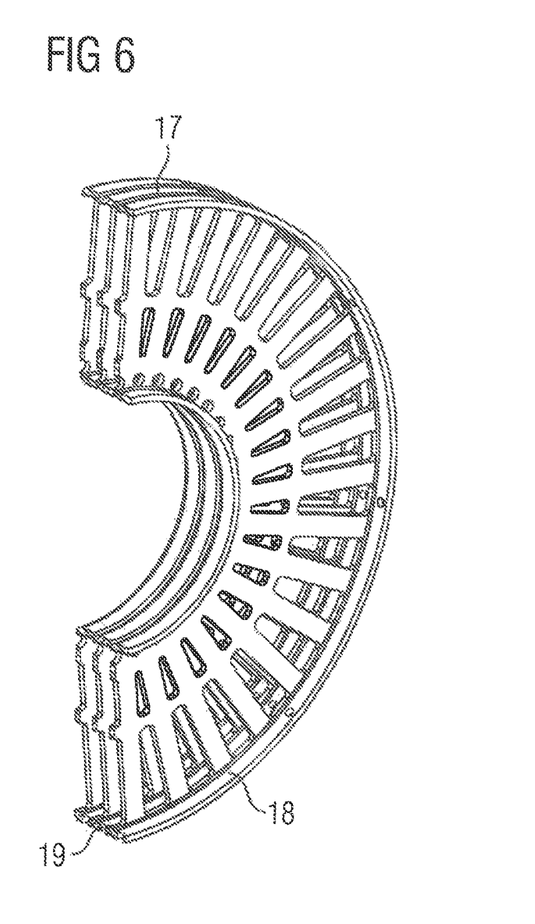
Figure 7:
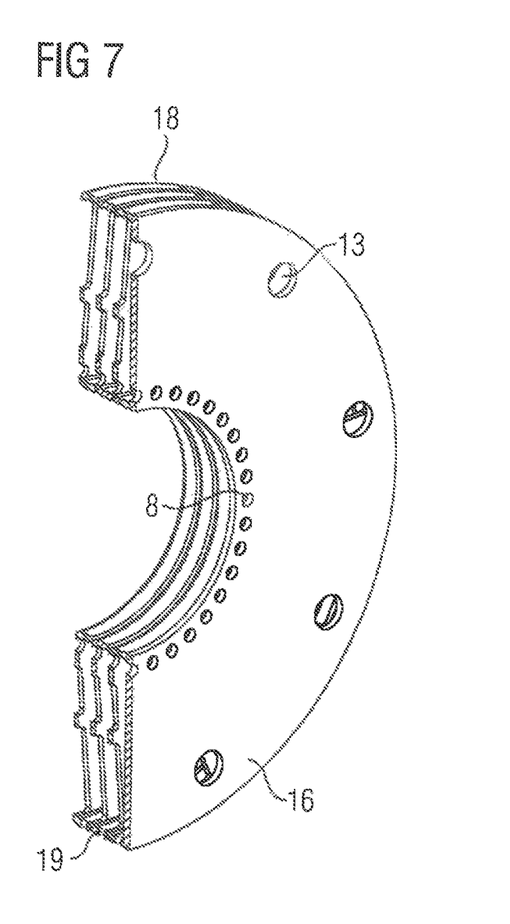

FIG. 6 or FIG. 7 shows in a further embodiment the formation of another type of lattice structure 14 in which individual deep-drawn metal sheets with the same or a different structure arranged axially one behind the other generate a lattice structure. There too, recesses 8 for venting are likewise present, as well as the injection channels 13 provided. The inner contour 9 is generated by the axial arrangement of the individual sheets one behind the other by a centering edge 19, likewise the outer contour 10. This also results in a reinforcement 24, which has an outer contour 10, an inner contour 9 as well as the lateral surfaces 25 and 26. The lattice structure 14 within this reinforcement is produced by means of a punch-deep drawing method and thus, although it is designed differently with respect to the structure, it has the same properties as the reinforcement 24 described above.

Figure 8:
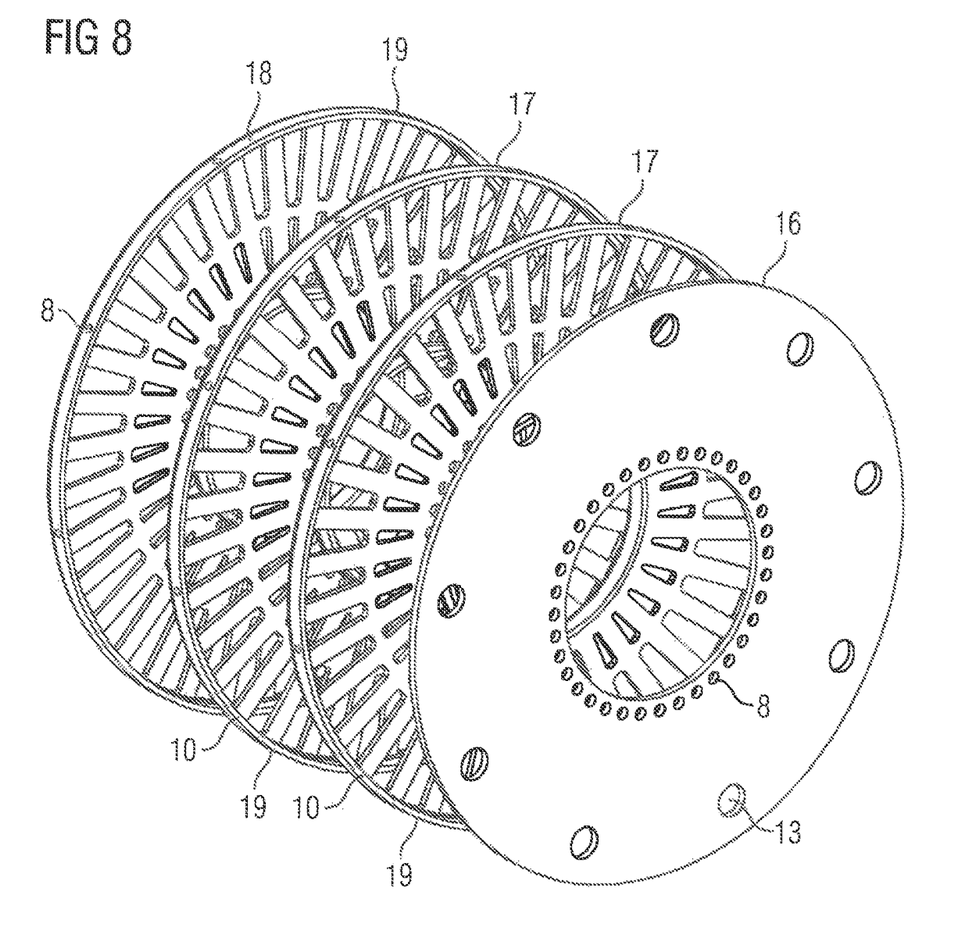

This can also be seen in particular in FIG. 8 where, in an exploded view, the lateral surfaces 25, 26 were referred to as deep-drawn sheet on the outside and as deep-drawn sheet on the inside. With their centering edges 19, the deep-drawn metal sheets 17 in the center form part of the inner contour and the outer contour, each deep-drawn sheet 17 having essentially radial webs 20 as well as circumferential webs in the center. Nodes within the meaning of this lattice structure 14 only join webs 20 together in the radial and in the circumferential direction.

Figure 9:
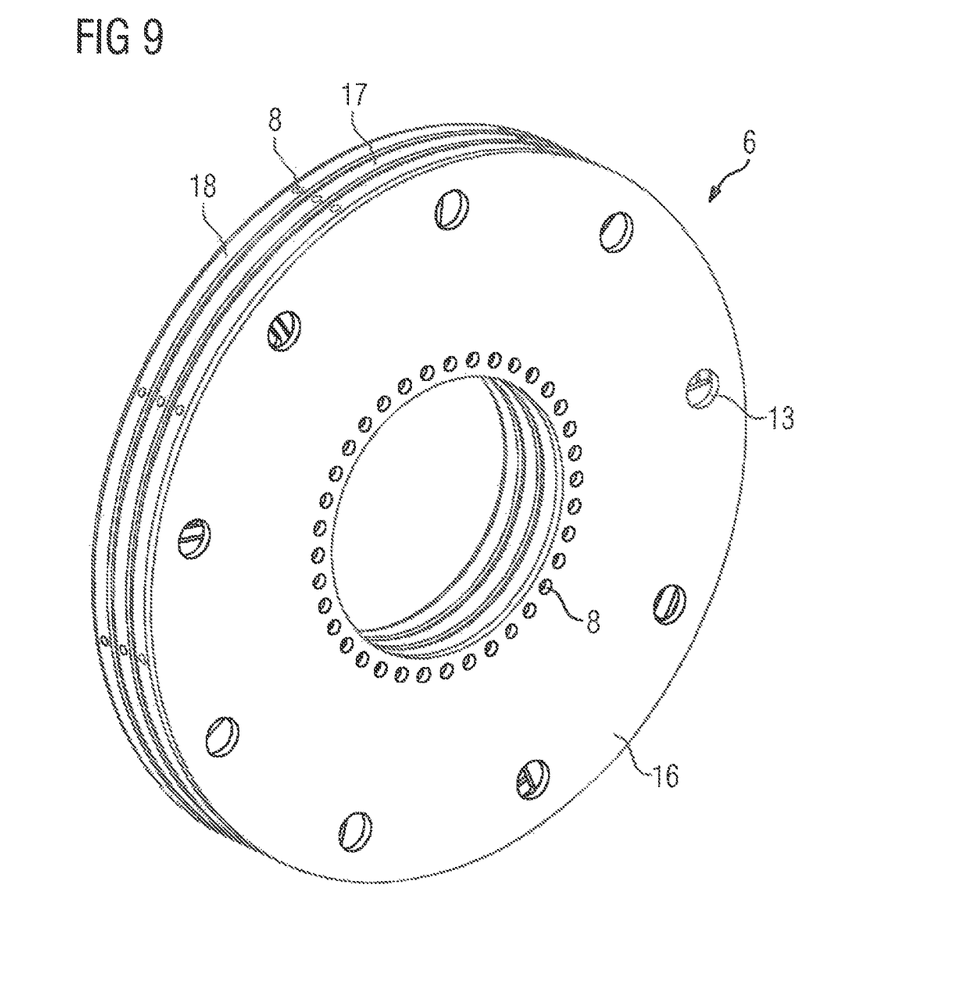

FIG. 9 shows a reinforcement 24 of the short-circuit ring 6 composed of deep-drawn metal sheets which likewise have ventilation recesses 8 as well as, at least in the case of a reinforcement, injection channels 13.

On its end faces the squirrel-cage rotor 6 thus has at least one reinforcement 24 made of tensile material in each case. Within the reinforcement 24 and in at least parts of the groove spaces, conductive material is present by means of a casting process.

If the groove spaces are not completely filled, prefabricated conductor rods, for example, made of copper have previously been positioned in these groove spaces, which project axially from the end faces of the laminated core 5 into the reinforcement 24. The remaining cavities in the grooves and the reinforcement 24 are taken up in the further production process by a conductive casting compound such as aluminum or copper.

The squirrel-cage rotor 6 according to the invention is suitable in particular for applications of an asynchronous machine in the high-speed range, i.e. at rotational speeds of circumferential speeds on the rotor of up to 200 m/s, such as for example, in drives in automotive engineering, such as for example, in e-cars, but also in machine tool technology or in pump and compressor drives.

The invention claimed is:

1. A squirrel-cage rotor of an asynchronous machine, said squirrel-cage rotor comprising:
   a laminated core having substantially axially extending grooves, said laminated core having end faces;
   electrical conductors received in the grooves;
   short-circuit rings respectively provided on the end faces of the laminated core for electrically connecting at least a predetermined number of the electrical conductors, each said short-circuit ring including a reinforcement which is made of high-strength material, said reinforcement having closed outer and inner circumferences, a laminated-core-distal lateral surface which is closed or has an opening, and a laminated-core-proximal lateral surface which has recesses for the electrical conductors; and
   a framework structure or lattice structure or microscale structure provided between outer and inner diameters of the reinforcement and end faces of the short-circuit rings and comprising webs extending in radial, circumferential, and axial directions which are joined together at nodes arranged at intersection points of the webs.

2. The squirrel-cage rotor of claim 1, wherein the electrical conductors are made of aluminum and/or copper.

3. The squirrel-cage rotor of claim 1, wherein the reinforcement has a substantially closed contour with an inner lattice structure as the lattice structure.

4. The squirrel-cage rotor of claim 1, wherein the lattice structure is located in a radially outer region of the short-circuit ring.

5. The squirrel-cage rotor of claim 1, wherein the reinforcement is produced by additive manufacturing.

6. A dynamoelectric machine, in particular an asynchronous, machine, said dynamoelectric machine comprising a squirrel-cage rotor which includes a laminated core having substantially axially extending grooves, said laminated core having end faces, electrical conductors received in the grooves, short-circuit rings respectively provided on the end faces of the laminated core for electrically connecting at least a predetermined number of the electrical conductors, each said short-circuit ring including a reinforcement which is made of high-strength material, said reinforcement having closed outer and inner circumferences, a laminated-core-distal lateral surface which is closed or has an opening, and a laminated-core-proximal lateral surface which has recesses for the electrical conductors, and a framework structure or lattice structure or microscale structure provided between outer and inner diameters of the reinforcement and end faces of the short-circuit rings and comprising webs extending in radial, circumferential, and axial directions which are joined together at nodes arranged at intersection points of the webs.

7. The dynamoelectric machine of claim 6, wherein the electrical conductors are made of aluminum and/or copper.

8. The dynamoelectric machine of claim 6, wherein the reinforcement has a substantially closed contour with an inner lattice structure as the lattice structure.

9. The dynamoelectric machine of claim 6, wherein the lattice structure is located in a radially outer region of the short-circuit ring.

10. The dynamoelectric machine of claim 6, wherein the reinforcement is produced by additive manufacturing.

11. A machine tool, an e-car, a compressor drive or pump drive, comprising a dynamoelectric machine as set forth in claim 6.

12. A method for producing a squirrel-cage rotor, said method comprising:
    punching and packaging laminations to form a laminated core;
    fastening reinforcements on end faces of the laminated core, respectively;
    providing, framework structure or lattice structure or microscale structure between outer and inner diameters of the reinforcement comprising webs extending in radial, circumferential, and axial directions which are joined together at nodes arranged at intersection points of the webs; and
    injecting a conductive casting compound via an injection channel into the reinforcements and groove spaces of the laminated core.

13. The method of claim 12, further comprising inserting electrically conductive rods into the groove spaces before injection of the casting compound.

14. The method of claim 13, wherein at least some of the conductive rods project into the reinforcements axially beyond the end faces of the laminated core.

15. The method of claim 12, further comprising producing the reinforcements by additive manufacturing.

* * * * *